Figure 5:
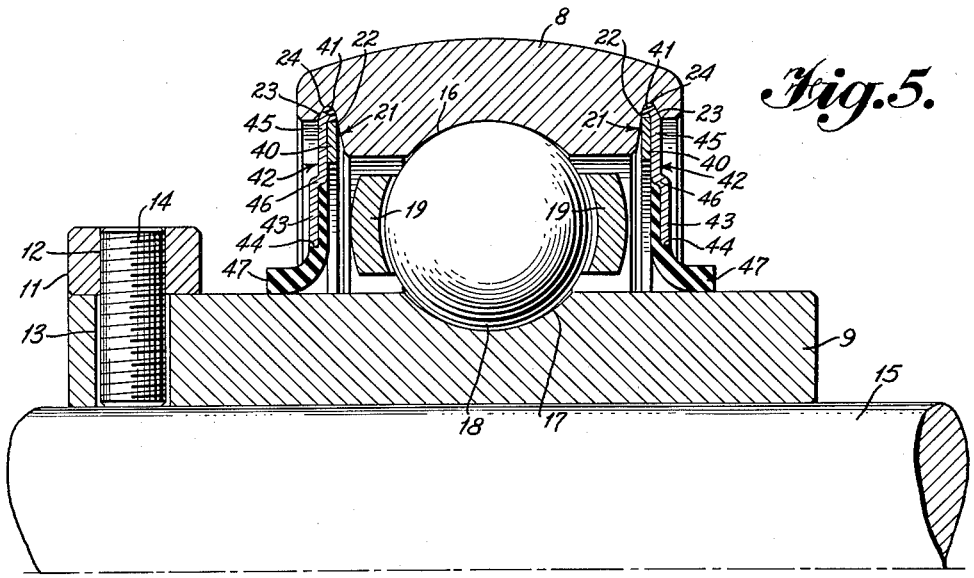

Sept. 6, 1955   R. E. BAUMHECKEL   2,717,185
BEARING SEAL
Filed May 12, 1952   2 Sheets-Sheet 1
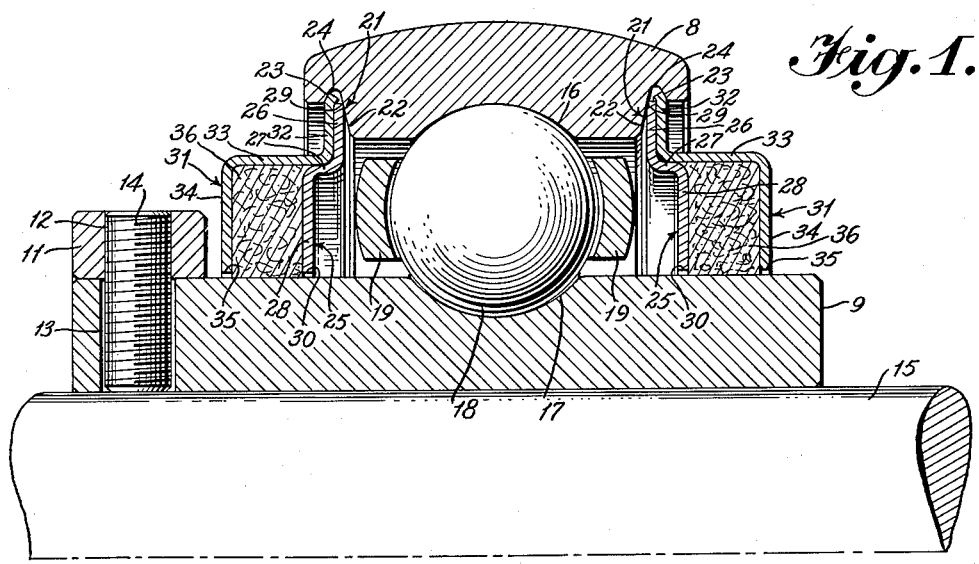
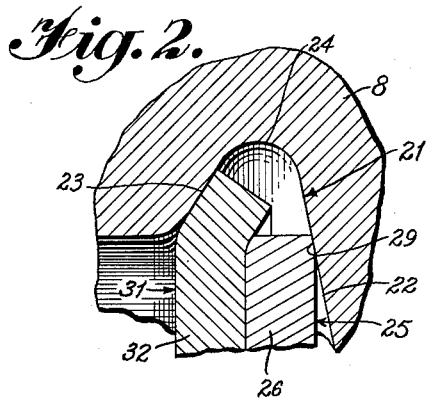
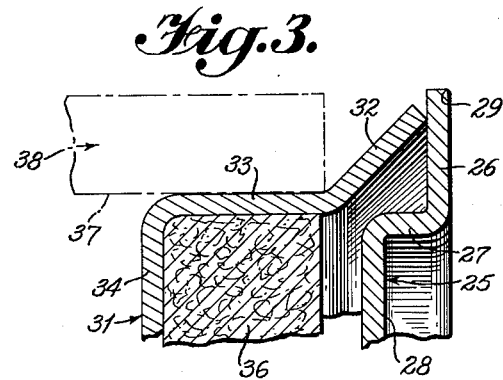
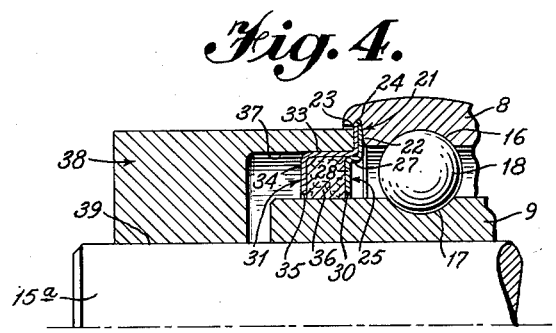
INVENTOR.
Ralph E. Baumheckel
BY
L. Ronald Myers
ATTORNEY Sept. 6, 1955 R. E. BAUMHECKEL 2,717,185
BEARING SEAL
Filed May 12, 1952 2 Sheets-Sheet 2

INVENTOR.
Ralph E. Baumheckel
BY
ATTORNEY

United States Patent Office 2,717,185
Patented Sept. 6, 1955

2,717,185

BEARING SEAL

Ralph E. Baumheckel, Connersville, Ind., assignor to Link-Belt Company, a corporation of Illinois Application May 12, 1952, Serial No. 287,321

4 Claims. (Cl. 308—187.2)

This invention relates to new and useful improvements in seals for bearings and deals more particularly with seals for closing the spaces between the race rings of antifriction bearing units.

It is conventional practice, in the production of bearing seals, to form various ones of the seal elements or parts from thin metal stock by stamping or similar operations. A complete seal or assembly is formed from two or more of the stamped parts and a flexible ring, formed of any suitable material, by a prefabricating operation. These seals are mounted in bearing units so as to prevent the ingress of foreign matter and the egress of lubricant. Usually, the mounting of a complete seal is accomplished by clamping its circumferential margin in a groove that is formed in the outer race ring of a bearing unit. From the outer race ring, the seal extends radially inwardly a sufficient distance to place the flexible ring in rubbing engagement with some surface portion of the inner race ring.

Several difficulties are encountered in the use of the above type of bearing seals. For example, the seals must be rigidly clamped in the grooves of the outer race rings to prevent any looseness which will allow radial movement of the seals to place the stamped parts in metal-to-metal contact with the inner race rings. Also, the seals must be clamped in their grooves in such a manner as to prevent creeping or rotation relative to their supporting race rings. In the past, however, the clamping of the seals in their grooves has created radial forces which cause the outer race rings to be distorted unless very close tolerances in the size and roundness of the seal parts and grooves are maintained. Such accurate tolerances are difficult, if not impossible, to maintain in the mass production of parts by stamping or similar operations.

It is the primary object of this invention to provide an improved bearing seal having a pair of generally radially disposed parts the margins of which are each rigidly clamped to a stationary member by engagement therewith in such a manner as to substantially eliminate the application of radial forces to the stationary member, as to minimize the deformation of the assembled seal parts, and as to eliminate variations in the radical forces exerted between different points in the margins of the parts and the stationary member despite limited variations in the size and roundness of the parts prior to assembly.

Still another object of this invention is to provide a type of bearing seal which is formed of two stamped metal parts that can be produced in large quantities with a relatively wide range of tolerances as to size and roundness, and which are simultaneously assembled and clamped to a stationary member with their margins each engaging the member in such a manner as to eliminate variations in the radial forces exerted between different points on the margins of the parts and the stationary member.

A further object of the invention is to provide a bearing seal formed of a pair of thin metal parts having mounting margins for engagement with each other and with opposed radially inclined surfaces of a mounting member in such a manner as to clamp the parts in fixed radial positions with a minimum of radial forces between the parts and the inclined surfaces.

Other objects and advantages of the invention will be apparent during the course of the following description.

Figure 6:
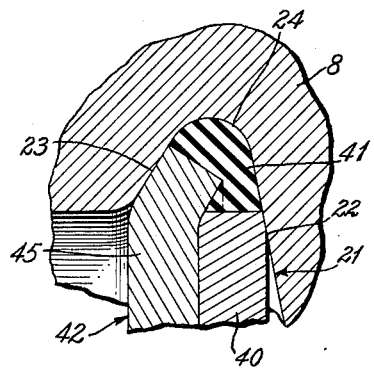
Figure 7:
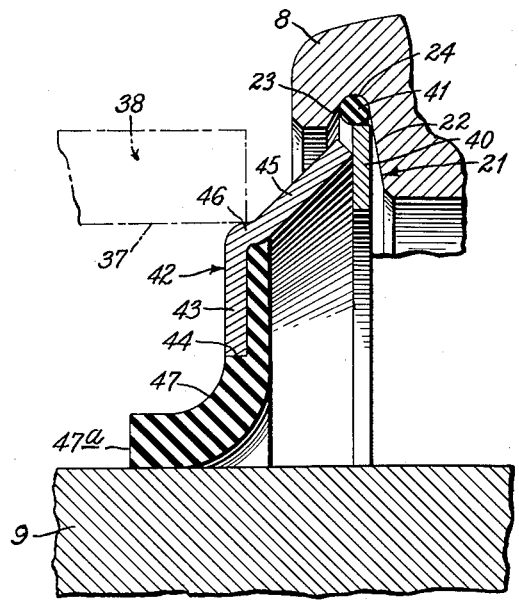

In the accompanying drawings forming a part of this specification and in which like reference characters are employed to designate like parts throughout the same, Figure 1 is a sectional view of a bearing and seal embodying the invention, Figure 2 is a fragmentary sectional view of the mounting groove and associated portions of the seal illustrated in Fig. 1, Figure 3 is a fragmentary sectional view showing the form and arrangement of the seal parts and the assembling tool positioned to effect the mounting of the seal in the receiving groove of the bearing race ring, Figure 4 is a sectional view showing the position of the seal parts and the tool when the seal is fully seated in its receiving groove, Figure 5 is a sectional view of a bearing and modified form of seal embodying the invention, Figure 6 is a fragmentary sectional view of the mounting groove and associated portions of the seal illustrated in Fig. 5, and Figure 7 is a fragmentary sectional view showing the form and arrangement of the seal parts and the assembling tool positioned to effect the mounting of the seal in the receiving groove of the bearing race ring.

In the drawings, wherein for the purpose of illustration are shown the preferred embodiments of the invention, and first particularly referring to Figs. 1 to 4, inclusive, reference character 8 designates the outer race ring of a bearing unit which also includes an inner race ring 9. The opposite ends of the inner race ring 9 extend axially outwardly beyond the ends of the outer race ring 8 and one end of the inner race ring is provided with a mounting collar 11 having a threaded aperture 12 in alinement with the aperture 13 in the inner race ring for receiving a set screw 14 to mount the inner race ring on the shaft 15. The opposed surfaces of the outer race ring 8 and the inner race ring 9 are provided with grooves or raceways 16 and 17, respectively, between which are positioned the balls 18. Proper circumferential spacing of the balls 18 is maintained by the cage 19 in a conventional manner.

Spaced axially outwardly from each side of the raceway 16 in the outer race ring 8 is a continuous, circumferentially extending seal receiving or mounting groove 21 which opens radially inwardly toward the inner race ring 9. The inner side wall 22 and the outer side wall 23 of the groove provide opposed conical surfaces which are arranged to converge toward the rounded bottom 24 of the groove. The outer side wall 23 terminates at a radially greater distance from the inner race ring 9 than the inner side wall 22.

Associated with each side of the bearing unit, to close the space between the outer and inner race rings, is a seal assembly that is mounted at its periphery in the corresponding receiving groove 21 of the outer race ring and has rubbing sealing engagement with the peripheral surface of the inner race ring. The two seal assemblies are of identical construction and each consists of an inner metallic seal ring, an outer metallic seal ring and a flexible sealing washer or ring that may be formed of felt, or any other suitable material. The following detail description of one of the identical seal assemblies will be sufficient for both.

The inner seal ring 25 is stamped, or otherwise formed, from thin metal stock in such a manner as to provide an outer mounting flange 26 which extends radially from the inner edge of the axially arranged shoulder 27 and an inner housing flange 28 that extends radially from the outer edge of said shoulder. The ring 25 is provided with a peripheral edge 29, that plays an important part in the mounting of the ring periphery in the receiving groove 21 of the outer race ring 8, and with a central opening 30. The mounting and the housing flanges 26 and 28, respectively, are spaced axially a distance that is equal to the width of the shoulder 27.

The outer seal ring 31 is stamped, or otherwise formed, from thin metal stock in such a manner as to provide an outer mounting flange 32 which initially is flared, see Fig. 3, to extend both axially and radially from the inner edge of the axially arranged shoulder 33 and an inner housing flange 34 that extends radially from the outer edge of said shoulder to the inner edge that defines the central opening 35. The mounting and housing flanges 32 and 34, respectively, are spaced axially, at least at their adjacent edges, a distance that is equal to the width of the shoulder 33.

It will be noted that the shoulder 33 has a substantially greater width than the shoulder 27 of the inner seal ring 35. This dimensional difference, when the inner and outer seal rings are assembled and properly positioned relative to the bearing unit, will form a housing for receiving the flexible sealing washer or ring 36.

The assembling of a complete seal in its space at one side of the bearing unit is accomplished in the manner best illustrated in Figs. 2, 3 and 4. The first step is the positioning of the inner seal ring 25 with its peripheral edge 29 in engagement with the inner side wall 22 of its receiving groove 21. The flexible sealing washer or ring 36 then will be positioned in the pocket or angle formed by the axial shoulder 33 and the housing flange 34 of the outer seal ring 31 and this partial assembly will be positioned with a peripheral edge of the flared mounting flange 32 in engagement with the outer face of the mounting flange 26 of the inner seal ring 25, as illustrated in Fig. 3.

This positioning operation can best be performed by fitting the outer seal ring 31 in the recess 37 of the mounting tool 38 and advancing the tool along the adjacent portion of a suitable assembling mandrel 15a, see Fig. 4. The bore 39 of the tool, by snugly fitting the assembling mandrel, will properly guide the outer seal ring and sealing washer assembly into the initial position illustrated in Fig. 3. Further advancement of the mounting tool 38 will cause the flared mounting flange 32 of the outer seal ring to be deformed or bent toward a truly radial position. However, before such a position is assumed, the inner surface of the shoulder 33 will engage the outer surface of the shoulder 37 for properly alining, or rendering concentric, the two seal rings 25 and 31.

As the mounting flange 32 is bent from its flared position toward its truly radial position, its outer edge will move radially of the mounting flange 26 of the inner race ring 25 until it engages the surface of the outer side wall 23 of the receiving groove 21 formed in the outer race ring 8. Further advancement of the tool 38, after this engagement occurs, will cause the peripheral edge portion of the mounting flange 32 to be forced into the space between the periphery of the mounting flange 26 of the inner seal ring 25 and the groove wall 23. As the peripheral edged portion of the mounting flange 32 advances through this space, the conical shape of the groove 23 will cause the said peripheral edge portion to be bent axially or into partial overlapping relationship with the peripheral edge of the mounting flange 26 of the inner seal ring 25, as best illustrated in Fig. 2.

When the seal is thus completely assembled, as seen in Figs. 1, 2 and 4, the peripheries of the two mounting flanges will be wedged or clamped between the conical side walls 22 and 23 of the receiving groove 21, entirely out of contact with the rounded bottom 24 of the groove, and with the marginal portion of the mounting flange 32 in face contact with a portion of the conical groove wall 23. The opposed radial faces of the two mounting flanges 26 and 32 and the opposed axial faces of the overlapped portions of the shoulders 27 and 33 will be in face contact, as clearly illustrated in Figs. 1, 2 and 4. Fig. 2 clearly illustrates the fact that the peripheral edge 29 and the opposite peripheral edge of the mounting flange 26 are deformed as a result of wedging or clamping the two ring peripheries in the receiving groove 21. The flexible sealing washer or ring 36 will be clamped or compressed between the two housing flanges 28 and 34 and will be held stationary thereby in sealing or rubbing engagement with the peripheral surface of the inner race ring 9.

Because the peripheries of both the inner and outer seal rings 29 and 31, respectively, terminate short of the round bottom 24 of the receiving groove 21, any variations in size, within normal tolerances, in the stamping operations by which the seal rings are formed, will have little or no effect on the proper clamping or wedging of the seal rings in the receiving groove 21. Furthermore, any distortion of the seal rings from truly round configurations will be corrected or compensated by the engagement between the axial shoulders 27 and 33 of the two seal rings, and by the clearance that is provided between the peripheries of the seal rings and the rounded bottom of the groove 21. In other words, the forces applied to the outer race ring 8 by the clamping or wedging action of the seal rings 25 and 31 are such that their major components extend axially, and such radial components as will be present are of insufficient magnitude to cause distortion of the outer race ring 8.

Referring now to the modification of the invention illustrated in Figs. 5 to 7, inclusive, it will be seen that the form and arrangement of the various parts of the bearing unit per se are identical to the corresponding bearing unit parts illustrated in Figs. 1 to 4, inclusive, and like reference characters have been applied to the identical parts of both structures. One of the two identical seal assemblies for the bearing unit of Figs. 5 to 7, inclusive, will be described in detail as follows:

This modified seal assembly, also, consists of an inner metallic seal ring, an outer metallic seal ring, both of which are clamped or wedged at their peripheries in an outer race ring receiving groove in the same manner as the seal assemblies of Figs. 1 to 4, inclusive, and a flexible sealing washer or ring having a rubbing sealing engagement with the peripheral surface of the inner race ring of the bearing unit. However, because the flexible sealing washer or ring of this modification is of a different type and is supported entirely by the outer seal ring, the two metallic seal rings of this seal assembly are shaped differently than the corresponding rings of the previously described seal assembly. Also, a deformable ring element is added to assist in properly positioning the inner metallic seal ring prior to and during assembly of the seal, and to provide a more perfect sealing action against the passage of any lubricant around the peripheries of the two metallic seal rings after assembly of the seal.

The inner seal ring 40 is stamped, or otherwise formed, from thin metal stock and merely consists of a flat, relatively narrow mounting flange or body. Because the central opening of this inner seal ring is so much larger than the outside diameter of the inner race ring 9 and, for that reason, cannot be supported on the inner race ring in approximately its final, concentric position during assembling of the seal, it is necessary to employ a deformable ring 41 to initially position the inner seal ring 40. This deformable ring 41 may be made of natural or synthetic rubber, or any other suitable material which will not be deteriorated by the lubricant that is used in the bearing unit.

The outer seal ring 42 is stamped, or otherwise formed, from thin metal stock in such a manner as to provide an inner housing flange 43, having a central opening formed by its inner edge 44, an outer mounting flange 45 which is initially flared, see Fig. 7, so as to extend both axially and radially, and an axial shoulder or offset 46 which joins the two flanges 43 and 45.

The flexible sealing washer or ring 47 of this modified seal structure is of the so-called lip type because of the manner in which the inner portion or lip 47a engages the peripheral surface of the inner race ring 9. The outer portion of this sealing washer or ring 47 is shaped so that it can be bonded to the inner face of the housing flange 43 and the inner edge 44 of this flange. Preferably, this lip type sealing washer or ring is formed of natural or synthetic rubber, or of any other material which will not be deteriorated by the lubricant that is used in the bearing unit.

The same assembling tool 38 is employed for forcing the outer seal ring into its assembled relationship relative to the inner seal ring and the receiving groove of the outer race ring. In fact, the assembling procedure or operation for this modified seal is identical with the corresponding operations for assembling the seal of Figs. 1 to 4, inclusive, with the single exception that the inner seal ring 40 is held in its concentric relationship by the deformable ring 41 instead of having the inner seal ring moved into its concentric relationship by the engagement of axial shoulders formed on the two seal ring members.

As is clearly illustrated in Figs. 5 and 6, the inner peripheral portions of both of the mounting flanges of the two seal rings assume the same clamped or wedged positions as was specifically described in connection with the first form of the invention. It is believed to be unnecessary, therefore, to repeat the description of the manner in which the modified seal is assembled relative to its bearing unit.

It will be noted that after the inner and outer seal rings are properly assembled in their receiving groove 21 of the outer race ring, the deformable ring 41 will function as a seal to prevent the passage of any lubricant from the interior of the bearing unit through the receiving groove 21 by passing around the peripheries of the two seal rings.

It is to be understood that the forms of this invention herewith shown and described are to be taken as the preferred examples of the same, and that various changes in the shape, size, and arrangement of parts may be resorted to without departing from the spirit of the invention or the scope of the subjoined claims.

Having thus described the invention, I claim:

1. In a sealing mechanism for a pair of concentric members spaced by bearing members to permit relative rotation, the outer concentric member having a radially inwardly opening groove spaced axially from said bearing members, said groove having its side walls angularly arranged to converge toward the bottom of the groove, a deformable annular member positioned in the bottom of said groove, a first seal ring member having its marginal portion positioned in said groove for engagement with the axially inner side wall of the groove and with said deformable ring, and a second seal ring having its marginal portion wedged between the marginal portion of first seal ring and the axially outer side wall of said groove to clamp the seal rings between the converging side walls radially inwardly of the bottom of said groove.

2. In a sealing mechanism for a pair of concentric members spaced by bearing members to permit relative rotation, the outer concentric member having a radially inwardly opening groove spaced axially from said bearing members, said groove having conical side walls oppositely arranged to converge toward the bottom of the groove, a deformable ring positioned in the bottom of said groove, a first seal ring having its marginal portion positioned in said groove with the inner edge of its peripheral surface in engagement with the axially inner side wall of the groove and with its peripheral surface in engagement with said deformable ring, a second seal ring having a radially disposed portion in face contact with said first seal ring and an angularly disposed marginal portion wedged between the outer edge of the peripheral surface of said first seal ring and the axially outer side wall of said groove to clamp the seal rings between the converging side walls radially inwardly of the bottom of said groove, said second seal ring extending from said groove into radially spaced relationship with the inner concentric member, and a flexible sealing ring attached to and extending radially inwardly from said second seal ring for sealing engagement with said inner concentric member.

3. In a sealing mechanism for a pair of concentric members spaced by bearing members to permit relative rotation, the outer concentric member having a radially inwardly opening groove spaced axially from said bearing members, said groove having its side walls arranged at opposite angles with respect to the axis of said concentric members to converge toward the bottom of the groove, a first seal ring having a radially arranged marginal portion positioned in said groove for sealing engagement between the periphery of the inner face of said marginal portion and the axially inner side wall of said groove, the remainder of said inner face being in spaced relationship with the angularly related axially inner side wall, and a second seal ring having its marginal portion wedged between the periphery of the outer face of the marginal portion of said first seal ring and the axially outer side wall of said groove to clamp the two rings in sealing engagement with the side walls of said groove out of contact with its bottom.

4. In a sealing mechanism for a pair of concentric members spaced by bearing members to permit relative rotation, the outer concentric member having a radially inwardly opening groove spaced axially from said bearing members, said groove having conical side walls oppositely arranged to converge toward the bottom of the groove, a first seal ring having a radially disposed marginal portion positioned in said groove with the periphery of its inner face in sealing engagement with the axially inner side wall of the groove, the remainder of said inner face being in spaced angular relationship with the conical inner side wall, and a second seal ring having a radially disposed portion in face contact with the outer face of the marginal portion of said seal ring and an angularly disposed marginal portion with one face thereof arranged radially outwardly of the periphery of said first seal ring, said angularly disposed marginal portion being wedged between the periphery of said first seal ring and the axially outer side wall of said groove to clamp the seal rings between and in sealing engagement with the converging side walls radially inwardly of the bottom of said groove.

References Cited in the file of this patent

UNITED STATES PATENTS

| | | |
|---|---|---|
| 1,917,988 | Large | July 11, 1933 |
| 2,114,954 | Brodin | Apr. 19, 1938 |
| 2,140,091 | Murden | Dec. 13, 1938 |
| 2,202,770 | Brodin | May 28, 1940 |
| 2,266,175 | Delaval-Crow | Dec. 16, 1941 |
| 2,274,201 | Horger | Feb. 24, 1942 |
| 2,419,885 | Cooper | Apr. 29, 1947 |
| 2,639,954 | Potter | May 26, 1953 |